United States Patent
Hara

(10) Patent No.: US 8,761,522 B2
(45) Date of Patent: Jun. 24, 2014

(54) IMAGE PROCESSING APPARATUS AND IMAGE PROCESSING METHOD

(75) Inventor: Takayuki Hara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 226 days.

(21) Appl. No.: 13/178,416

(22) Filed: Jul. 7, 2011

(65) Prior Publication Data

US 2012/0008867 A1    Jan. 12, 2012

(30) Foreign Application Priority Data

Jul. 9, 2010   (JP) ................................. 2010-156921

(51) Int. Cl.
 G06K 9/62   (2006.01)
 G06K 9/36   (2006.01)
 G06K 9/46   (2006.01)

(52) U.S. Cl.
 USPC .......................................... 382/224; 382/236

(58) Field of Classification Search
 None
 See application file for complete search history.

(56) References Cited

U.S. PATENT DOCUMENTS

| | | | | |
|---|---|---|---|---|
| 5,278,915 A * | 1/1994 | Chupeau et al. | ............... | 382/236 |
| 5,576,772 A * | 11/1996 | Kondo | ............... | 348/699 |
| 5,610,658 A * | 3/1997 | Uchida et al. | ............... | 348/416.1 |
| 5,742,710 A * | 4/1998 | Hsu et al. | ............... | 382/236 |
| 6,295,377 B1 * | 9/2001 | Dufaux et al. | ............... | 382/236 |
| 6,430,317 B1 * | 8/2002 | Krishnamurthy et al. | .... | 382/236 |
| 6,560,371 B1 * | 5/2003 | Song et al. | ............... | 382/240 |
| 6,594,397 B1 * | 7/2003 | Hu | ............... | 382/236 |
| 6,842,483 B1 * | 1/2005 | Au et al. | ............... | 375/240.16 |
| 7,239,721 B1 * | 7/2007 | Kumar et al. | ............... | 382/107 |
| 7,983,341 B2 * | 7/2011 | Wang | ............... | 375/240.16 |
| 2003/0012282 A1 * | 1/2003 | Chelladurai et al. | ...... | 375/240.16 |

FOREIGN PATENT DOCUMENTS

JP   S63-181585 A   7/1988
JP   2009-055410 A   3/2009

OTHER PUBLICATIONS

Han et al., A Novel Hierarchical-Search Block Matching Algorithm and VLSI Architecture Considering the Spatial Complexity of the Macroblock, 1998, IEEE Transactions on Consumer Electronics, vol. 44, No. 2, pp. 337-342.*

Turaga et al., Search Algorithms for Block-Matching in Motion Estimation, 1998, Course material from Carnegie Mellon University.*

Tae-Hee Han et al.; "A novel hierarchical-search block matching algorithm and VLSI architecture considering the spatial complexity of the macroblock;" IEEE Transactions on Consumer Electronics, vol. 44; No. 2, May 1998; pp. 337-342.

* cited by examiner

Primary Examiner — Stephen R Koziol
Assistant Examiner — Jonathan S Lee
(74) Attorney, Agent, or Firm — Canon USA, Inc. IP Division

(57) ABSTRACT

An image processing apparatus reduces image data on a first rank to generate image data on a second rank, and acquires an evaluation value of sharpness from the image data on the second rank. When the evaluation value is equal to or more than a threshold value, the image processing apparatus acquires a motion vector from the image data on the second rank. The image processing apparatus, based on the acquired motion vector, sets a detection area of correlation between the image data on the first rank, to detect the motion vector on the first rank. When the evaluation value of the image data on the second rank is less than the threshold value, the image processing apparatus does not need to acquire the motion vector in the image data on the second rank but detects the motion vector in the image data on the first rank.

6 Claims, 11 Drawing Sheets

| -1 | -1 | -1 |
|---|---|---|
| -1 | 8 | -1 |
| -1 | -1 | -1 |

IMAGE PROCESSING APPARATUS AND IMAGE PROCESSING METHOD

BACKGROUND OF THE INVENTION

1. Field of the Invention

The present invention relates to an image processing apparatus that detects a motion vector from a plurality of images and a method thereof.

2. Description of the Related Art

Block matching for acquiring a motion vector between two images from a correlation thereof has been developed by focusing on a technique for compressing a moving image. Since such a technique for acquiring the motion vectors can acquire a shift among positions of a plurality of images that are shot in sequence, the technique can be applied to various kinds of technique fields such as electronic image stabilization processing performed by combining a plurality of images and dynamic range expansion processing.

Block matching is a method for acquiring motion vectors between the two images by moving rectangular blocks that have predetermined sizes and are set in each image to calculate the correlation of the images at a plurality of positions and by acquiring the position having the highest correlation.

FIG. 9 schematically illustrates an embodiment of block matching. Image data 901 is a reference image used for acquiring the motion vector. Image data 902 is a target image for acquiring the motion vector with respect to the image data 901.

First, an image processing apparatus sets abase block 903 that is a region as a reference in the image data 901 for acquiring the motion vector. In the image data 902, the image processing apparatus acquires a projection block 904 having a position corresponding to and the same size as that of the base block 903 in the image data 901 and, with reference to the position of the projection block 904, sets a detection area 905 that has a predetermined size and includes the projection block 904.

In the image data 902, the image processing apparatus sets a target block 906 that is included in the detection area 905 and has the same size as that of the base block 903. The image processing apparatus then obtains a correlation between the image of the base block 903 in the image data 901 and that of the target block 906 in the image data 902. The image processing apparatus further obtains a sum of absolute differences (SAD) between a signal level of image data of the base block 903 and that of the target block 906. The image processing apparatus determines that, the smaller the value of the SAD is, the higher the correlation between the images of the base block 903 and the target block 906 is.

The image processing apparatus moves the target block 906 to a whole region in the detection area 905 to acquire the SAD every time the target block 906 is moved. By detecting a position of the target block 906 having the smallest value of the SAC, in the detection area 905, the position can be acquired in which the image of the target block 906 has the highest correlation with that of the base block 903. The image processing apparatus acquires a shift between the positions of the base block 903 and the target block 906 as a motion vector of the image data of the base block 903 between the image data 901 and the image data 902. By setting a plurality of positions of the base block 903, a plurality of motion vectors between the image data 901 and the image data 902 can be acquired.

FIG. 10 illustrates an arithmetic circuit 1001 that is included in the image processing apparatus and acquires the SAD from the image data of the base block 903 and that of the target block 906.

The image processing apparatus includes the arithmetic circuit 1001, receives the image data of the base block 903 via a terminal of an input 1, and receives that of the target block 906 via a terminal of an input 2. The arithmetic circuit 1001 subtracts, from the signal level of each pixel in image data of the base block 903, the signal level of a corresponding pixel in that of the target block 906, and then adds up the absolute values to acquire the SAD.

For example, the image data of the base block 903 and that of the target block 906 each include the signals of 256 pixels of 16×16. The signal levels of each pixel of the image data of the base block 903 are defined as P(1, 1), P(1, 2), ..., P(1, 16), P(2, 1), P(2, 2), ..., P(16, 16). The signal levels of each pixel of the image data of the target block 906 are defined as Q(1, 1), Q(1, 2), ..., Q(1, 16), Q(2, 1), Q(2, 2), ..., Q(16, 16).

The arithmetic circuit 1001 can acquire the SAD from the following equation (1):

$$SAD = \sum_{i=1}^{16} \sum_{j=1}^{16} |P(i, j) - Q(i, j)| \tag{1}$$

If the detection area 905 is set as a region including 25×25 pixels having the projection block 904 as a center thereof, the target block 906 can move to 10 positions each vertically and horizontally. Accordingly, up to 100 SADs can be acquired in the detection area 905. Further, if the detection area 905 is set as a region including 32×32 pixels having the projection block 904 as a center thereof, the target block 906 can move to 17 positions each vertically and horizontally. Accordingly, up to 289 SADs can be acquired in the detection area 905.

As described above, the larger the ratio of the number of the pixels included in the detection area 905 to that in the base block 903 is set, the more the number of arithmetic operations for acquiring the SAD increases. Therefore, a processing time is increased. However, if the detection area 905 is decreased to decrease the number of calculations, it may not be able to detect the motion vector.

SUMMARY OF THE INVENTION

The present invention is directed to an image processing apparatus capable of decreasing arithmetic operation load for detecting a motion vector while suppressing erroneous detection of the motion vector.

According to an aspect of the present invention, an image processing apparatus includes: a reduction unit configured to generate image data on a plurality of ranks by reducing image data to generate image data on another rank; an evaluation unit configured to calculate an evaluation value of sharpness of the image data; and a motion vector detection unit configured to, by acquiring a correlation while moving any one of positions of a plurality of pieces of image data on a same rank, detect a motion vector between the plurality of pieces of image data. When the evaluation value of image data on a second rank generated by reducing image data on a first rank is equal to or more than a predetermined threshold value, the motion vector detection unit sets, based on a motion vector in the image data on the second rank, a detection area of correlation in the image data on the first rank, acquires the correlation between the image data in the detection area of the image data on the first rank, and detects the motion vector in the image data on the first rank. When the evaluation value in the image data on the second rank is not equal to or more than the predetermined threshold value, without setting, based on the motion vector in the image data on the second rank, the detection area of the correlation in the image data on the first rank, the motion vector detection unit detects the motion vector in the image data on the first rank.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
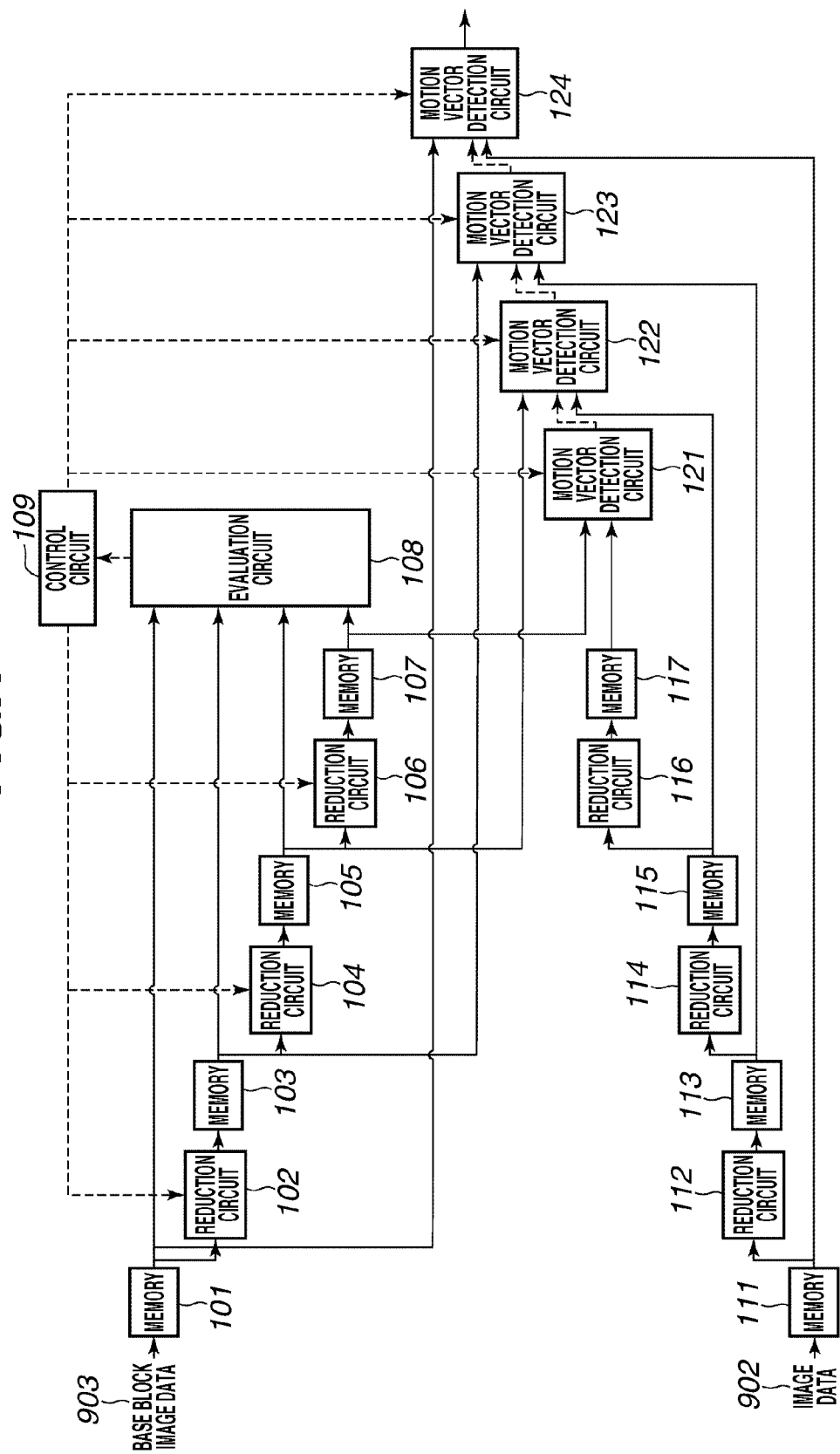
FIG. 1 is a block diagram illustrating an example of a configuration of an image processing apparatus according to an exemplary embodiment of the present invention.
Figure 2A:
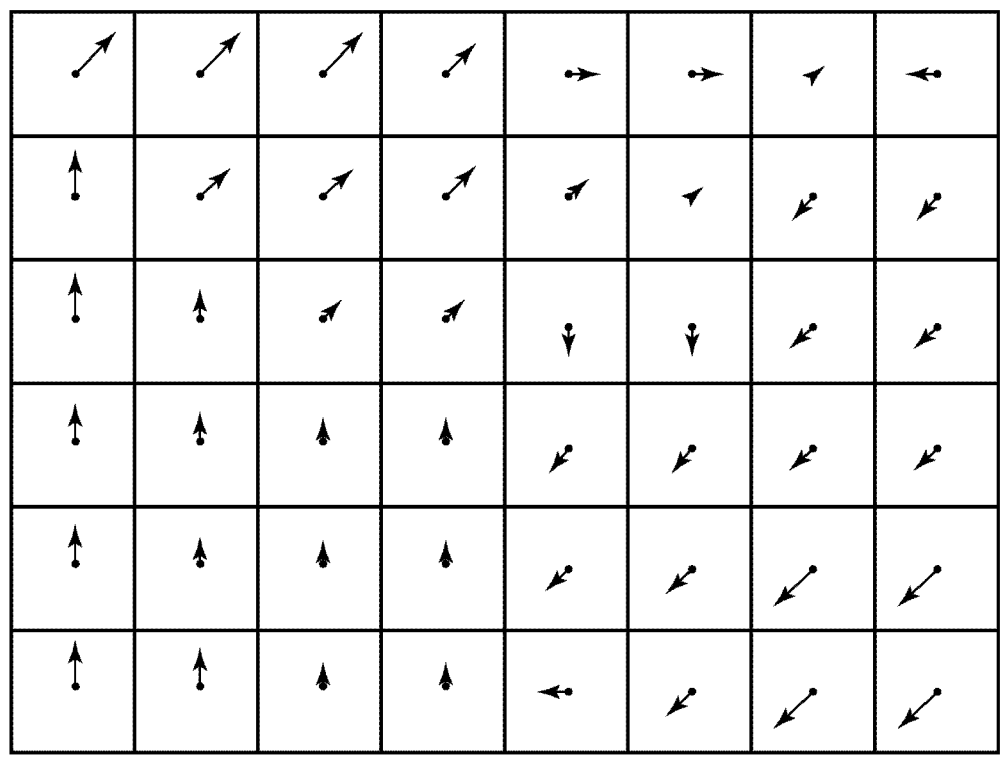
FIG. 2A is a schematic diagram illustrating blocks for acquiring motion vectors and FIG. 2B schematically illustrates block matching.
Figure 2B:
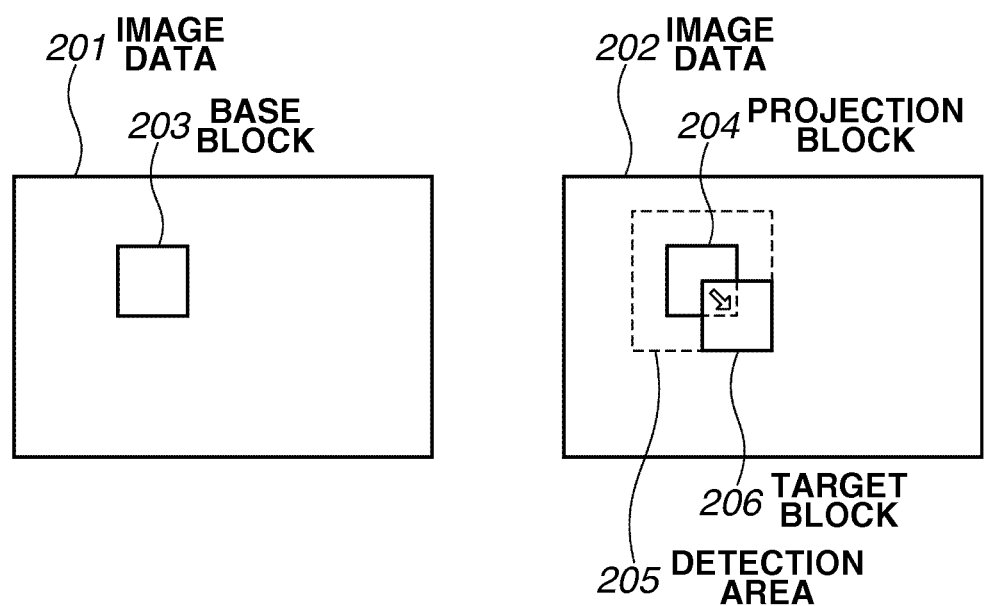

FIG. 1 is a block diagram illustrating an example of a configuration of an image processing apparatus according to a first exemplary embodiment of the present invention. FIG. 2A is a schematic diagram illustrating blocks for acquiring motion vectors and FIG. 2B schematically illustrates block matching. According to the present exemplary embodiment, as illustrated in FIGS. 2A and 2B, the input image data 201 is divided into a number of blocks to acquire motion vectors between the image data 201 and the image data 202 for each block. From a plurality of such motion vectors, a representative motion vector between the image data 201 and the image data 202 is calculated and can be used for electronic image stabilization processing or dynamic range expansion processing.

For example, the base block 203 in the image data 201 is set to include 16×16 pixels and the detection area 205 in the image data 202 is set to include 32×32 pixels. According to the method described above, to detect motion vectors, 289 SADs need to be acquired. The image data 201 and the image data 202 are herein defined as image data on a first rank. If the image data 201 and the image data 202 on the first rank are converted into image data on a second rank in which the image data 201 and 202 are reduced to ½ each vertically and horizontally, the same base block 203 includes 8×8 pixels, and the detection area 205 includes 16×16 pixels.

Further, if the image data on the second rank is converted into image data on a third rank in which the image data on the second rank is reduced to ½ each vertically and horizontally, the same base block 203 includes 4×4 pixels and the detection area 205 includes 8×8 pixels. Furthermore, if the image data on the third rank is converted into image data on a fourth rank in which the image data on the third rank is reduced to ½ each vertically and horizontally, the same base block 203 includes 2×2 pixels and the detection area 205 includes 4×4 pixels. Since, if the image data on the fourth rank is used, the target block 206 can move to three positions each vertically and horizontally, 9 SADs need to be acquired to detect the motion vectors. In addition, since the base block 203 includes the small number of pixels, the number of arithmetic operations to be performed in equation (1) for acquiring the SAD can be decreased.

However, the motion vector acquired using the image data on the fourth rank has ½ resolution power compared to that acquired using the image on the third rank. This means that the motion vector acquired using the image data on the fourth rank has ¼ resolution power compared to that acquired using the image data on the second rank, and ⅛ resolution power compared to that on the first rank.

To address this issue, on the image data in the detection area 205 on the third rank, a center position acquired by the motion vectors acquired from the image data on the fourth rank is set and, using the center position as a reference, a new detection area including 6×6 pixels is set. The reason why the new detection area includes 6×6 pixels is that the image data of the base block 203 on the second rank includes 4×4 pixels and an outer region of 6×6 pixels is already excluded based on a result of detecting the motion vector acquired using the fourth rank. Nine SADs are necessary from the image data on the third rank to detect the motion vectors of the image data thereof. With this arrangement, the motion vector having the ¼ resolution power compared to the motion vector acquired using the image data on the first rank can be acquired.

Further, on the image data of the detection area 205 on the second rank, a center position acquired by the motion vectors acquired from the image data on the third rank is set, and using the center position as a reference, a new detection area including 10×10 pixels is set. The reason why the new detection area includes 10×10 pixels is that the image data of the base block 203 on the second rank includes 8×8 pixels and an outer region of 10×10 pixels is already excluded based on a result of detecting the motion vectors acquired using the third rank. Nine SADs are necessary from the image data on the second rank to detect the motion vectors of the image data thereon. With this arrangement, the motion vector having the ½ resolution power compared to the motion vector acquired using the image data on the first rank can be acquired.

Further, on the image data of the detection area 205 on the first rank, a center position acquired by the motion vectors acquired from the image data on the second rank is set, and using the center position as a reference, a new detection area including 18×18 pixels is set. The reason why the new detection area includes 18×18 pixels is that the image data of the base block 203 on the first rank includes 16×16 pixels and an outer region of 18×18 pixels is already excluded based on a result of detecting the motion vectors acquired using the second rank. Nine SADs are necessary from the image data on the first rank. As a result, the motion vectors having the same accuracy as that by the conventional method in which 289 SADs are acquired can be acquired.

In the conventional method, 289 arithmetic operations for acquiring the SADs are performed to acquire the motion vectors. However, according to the method described above, the number of arithmetic operations for acquiring the SADs can be decreased to 36. Further, in the image data of the second to the fourth ranks, the number of arithmetic operations in equation (1) for acquiring the SAD can be also decreased. However, according to this method, resizing the image data 201 and 202 results in a loss of high-frequency components included in those image data. Therefore, if most of objects included in those image data are composed mainly of high-frequency components, this method may cause an erroneous detection of motion vectors. Thus, the image processing apparatus according to the present exemplary embodiment has such a configuration to improve this issue.

In FIG. 1, a memory 101 stores the image data of the base block 203. The image data stored in the memory 101 is defined as the image data of the first rank. A reduction circuit 102 generates image data on the second rank by reducing that on the first rank stored in the memory 101 to ½ each vertically and horizontally.

A memory 103 stores the image data on the second rank. A reduction circuit 104 generates image data on the third rank by reducing that on the second rank stored in the memory 103 to ½ each vertically and horizontally.

In other words, the image data on the third rank is acquired by reducing that on the first rank to ¼ each vertically and horizontally. A memory 105 stores the image data on the third rank. A reduction circuit 106 generates image data on the fourth rank by reducing that on the third rank stored in the memory 105 to ½ each vertically and horizontally. In other words, the image data on the fourth rank is acquired by reducing that on the first rank to ⅛ each vertically and horizontally.

A memory 107 stores the image data on the fourth rank. An evaluation circuit 108 acquires evaluation values of the image data on the first rank stored in the memory 101, the image data on the second rank stored in the memory 103, the image data on the third rank stored in the memory 105, and the image data on the fourth rank stored in the memory 107. A control circuit 109 controls the entire image processing apparatus, receives the evaluation values acquired by the evaluation circuit 108, and transmits instructions to reduction circuits 102, 104, and 106 and vector detection circuits 121, 122, 123, and 124.

A memory 111 stores the image data 202 as the image data on the first rank. A reduction circuit 112 generates the image data on the second rank by reducing that on the first rank stored in the memory 111 to ½ each vertically and horizontally. A memory 113 stores the image data on the second rank. A reduction circuit 114 generates the image data on the third rank by reducing that on the second rank stored in the memory 113 to ½ each vertically and horizontally. In other words, the image data on the third rank can be acquired by reducing that on the first rank to ¼ each vertically and horizontally.

A memory 115 stores the image data on the third rank. A reduction circuit 116 generates the image data on the fourth rank by reducing that on the third rank stored in the memory 115 to ½ each vertically and horizontally. In other words, the image data on the fourth rank can be acquired by reducing that on the first rank to ⅛ each vertically and horizontally. A memory 117 stores the image data on the fourth rank.

A motion vector detection circuit 121 detects the motion vectors using the image data on the fourth rank stored in the memories 107 and 117. The motion vector detection circuit 122 detects the motion vectors using the image data on the third rank stored in the memories 105 and 115.

A motion vector detection circuit 123 detects the motion vectors using the image data on the second rank stored in the memories 103 and 113. A motion vector detection circuit 124 detects the motion vectors using the image data on the first rank stored in the memories 101 and 111. These motion vector detection circuits 121, 122, 123, and 124 each can acquire the SAD, which is the sum of absolute differences between the signal levels of two pieces of image data.

Arrows of solid lines illustrated in FIG. 1 indicate flows of the image data, and arrows of dotted lines indicate flows of control data. Further, the memories 101 to 117 are illustrated as separate circuits for sake of simplicity. However, one circuit may have the functions of those memories. Similarly to the memories 101 to 117, one circuit may have the functions of the reduction circuits 102 to 116 or that of the motion vector detection circuits 121, 122, 123, and 124.

The present exemplary embodiment is described in two parts. One is rank determination processing for determining the rank of the image data used for detecting the motion vector. Another one is motion vector detection processing for detecting the motion vector using the image data of the rank determined by the rank determination processing.

Figure 3:
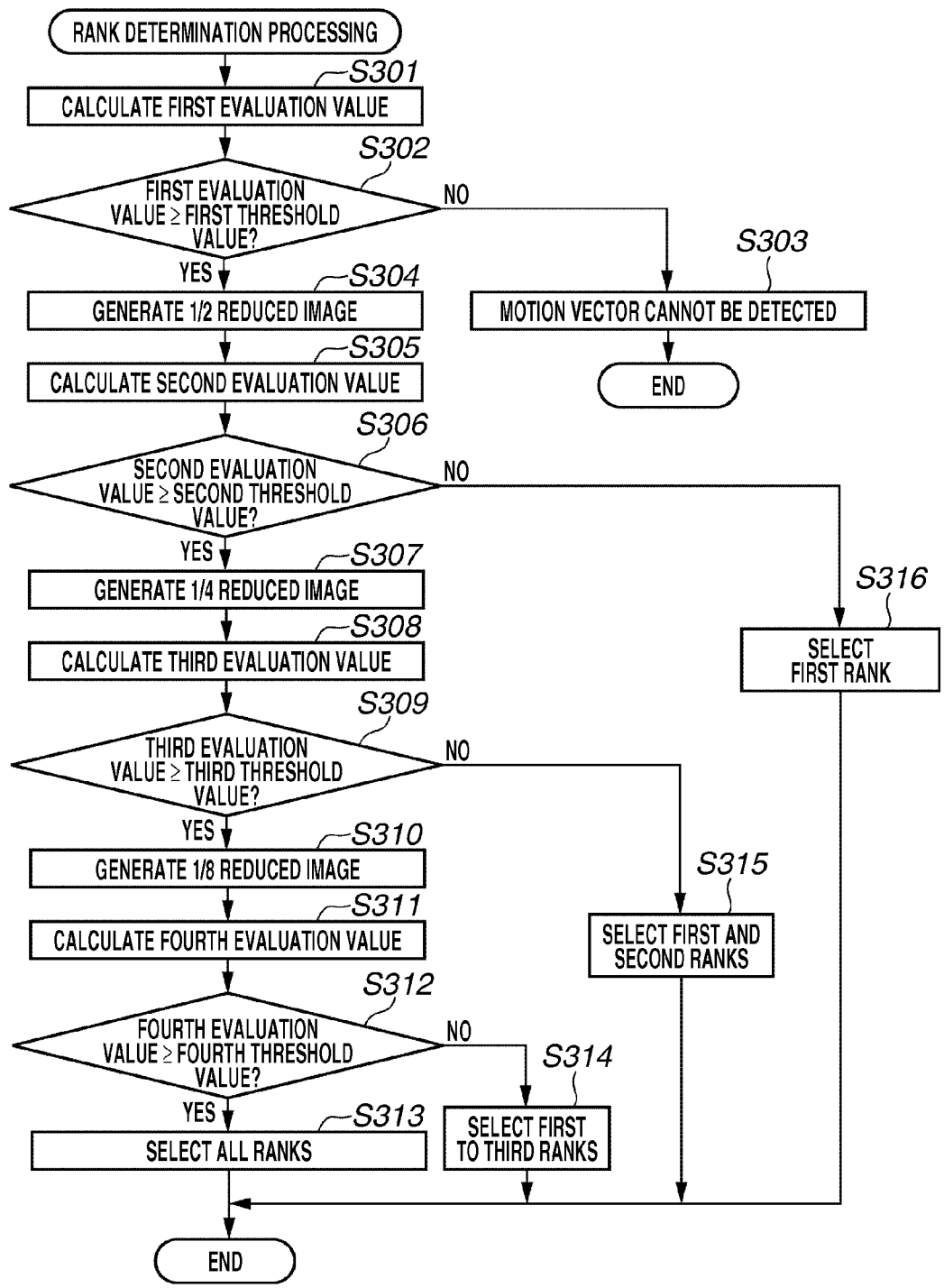
FIG. 3 is a flowchart illustrating rank determination processing.

FIG. 3 is a flowchart illustrating the rank determination processing. The control circuit 109 selects any base block 203 in the image data 201. When the image data of the base block 203 is input to the memory 101, the rank determination processing illustrated in FIG. 3 is started.

In step S301, the evaluation circuit 108 calculates a first evaluation value from the image data on the first rank of the base block 203 stored in the memory 101.

Figures 4A, 4B:
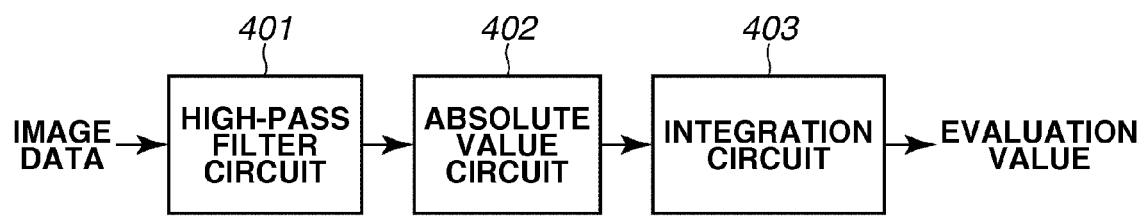
FIG. 4A is a block diagram illustrating a configuration of an evaluation circuit.
FIG. 4B illustrates filter coefficients.

FIG. 4A is a block diagram illustrating a configuration of the evaluation circuit 108. The evaluation circuit 108 includes a high-pass filter circuit 401, an absolute value circuit 402, and an integration circuit 403.

The high-pass filter circuit 401 includes a two-dimensional finite impulse response filter (FIR), which is a space filter for extracting a high-frequency component of the input image data and has filter coefficients illustrated FIG. 4B, for example. The filter for extracting a high-frequency component is not limited to the filter described above, and further, the known methods can be also applied.

Although an output of a high-pass filter has typically positive and negative values, a purpose herein is to evaluate whether contrast of a certain level is generated. Thus, to extract only a width of amplitude of the value output from the high-pass filter circuit 401, the absolute value circuit 402 acquires an absolute value of the value output from the high-pass filter circuit 401.

The absolute value circuit 402 may be simply constituted such that a negative number reverses all bits. The processing described above is performed on the whole image data input into the evaluation circuit 108. The integration circuit 403 integrates the absolute value acquired by the absolute value circuit 402 from each pixel, and outputs the integrated value as the evaluation value. The more even the input image data is, the smaller the evaluation value becomes. The more the input image data includes high contrast portions, the larger the value becomes.

FIG. 4A illustrates an example of a configuration of the evaluation circuit 108, and the evaluation circuit 108 may have a different configuration. Since the evaluation circuit 108 evaluates sharpness of the signal level of the input image data, for example, the evaluation circuit 108 may be constituted such that the larger a value of calculated dispersion of the input image data is, the higher the evaluation value is acquired.

Referring back to FIG. 3, in step S302, the control circuit 109 compares the first evaluation value acquired from the image data on the first rank with a first threshold value. When it is determined that the first evaluation value is less than the first threshold value (NO in step S302), the processing proceeds to step S303. When it is determined that the first evaluation value is equal to or more than the first threshold value (YES in step S302), the processing proceeds to step S304. When the evaluation value is low, the sharpness of the image data is low and a difference between the signal levels in the regions or pixels is not distinct.

More specifically, even if the image data of the target block 206 is moved and the SAD of the image data of the base block 203 is acquired at each position, the difference between the values is not distinct, thereby probably generating erroneous detection of the motion vector. Thus, the threshold value of the evaluation value with which the erroneous detection of the motion vector is scarcely generated is predetermined. From a result of comparing the evaluation value with the threshold value, it is determined whether the image data from which the evaluation value is acquired is appropriate for detecting the motion vector.

In step S303, the control circuit 109 determines that the motion vector cannot be detected from the image data of the base block 203. When it is determined that the motion vector cannot be detected, the flowchart illustrated in FIG. 3 once ends. When the control circuit 109 selects another base block 203 in the image data 201 and the image data of another base block 203 is input into the memory 101, the rank determination processing illustrated in FIG. 3 starts again.

In step S304, the control circuit 109 transmits to the reduction circuit 102 an instruction for reducing the image data. Upon receiving the instruction, the reduction circuit 102 reads the image data on the first rank from the memory 101 and generates ½ reduced image data on the second rank, and the memory 103 stores the image data on the second rank.

In step S305, the evaluation circuit 108 calculates a second evaluation value from the image data on the second rank of the base block 203 stored in the memory 103.

In step S306, the control circuit 109 compares the second evaluation value acquired from the image data on the second rank with the second threshold value. When it is determined that the second evaluation value is equal to or more than the second threshold value (YES in step S306), the processing proceeds to step S307. When it is determined that the second evaluation value is less than the second threshold value (NO in step S306), the processing proceeds to step S316.

In step S307, the control circuit 109 transmits to the reduction circuit 104 an instruction for reducing the image data. Upon receiving the instruction, the reduction circuit 104 reads the image data on the second rank from the memory 103 and generates ½ reduced image data on the third rank, and then the memory 105 stores the image data on the third rank.

In step S308, the evaluation circuit 108 calculates a third evaluation value from the image data of the base block 203 on the third rank stored in the memory 105.

In step S309, the control circuit 109 compares the third evaluation value acquired from the image data on the third rank with the third threshold value. When it is determined that the third evaluation value is equal to or more than the third threshold value (YES in step S309), the processing proceeds to step S310. When it is determined that the third evaluation value is less than the third threshold value (NO in step S309), the processing proceeds to step S315.

In step S310, the control circuit 109 transmits to the reduction circuit 106 an instruction for reducing the image data. Upon receiving the instruction, the reduction circuit 104 reads the image data on the third rank from the memory 105 and generates ½ reduced image data on the fourth rank, and then the memory 107 stores the image data on the fourth rank.

In step S311, the evaluation circuit 108 calculates a fourth evaluation value from the image data of the base block 203 on the fourth rank stored in the memory 107.

In step S312, the control circuit 109 compares the fourth evaluation value acquired from the image data on the fourth rank with the fourth threshold value. When it is determined that the fourth evaluation value is equal to or more than the fourth threshold value (YES in step S312), the processing proceeds to step S313. When it is determined that the fourth evaluation value is less than the fourth threshold value (NO in step S312), the processing proceeds to step S314.

In step S313, the control circuit 109 determines that, even if the motion vector is acquired from the image data on the fourth rank, the erroneous detection is not probably generated, and then determines to detect the motion vector using all image data of the first, second, third, and fourth ranks. In other words, the control circuit 109 transmits instructions for detecting the motion vectors to all the vector detection circuits 121, 122, 123, and 124.

The control circuit 109 transmits to the motion vector detection circuit 122 an instruction for using a detection result of the motion vector detection circuit 121, the motion vector detection circuit 123 an instruction for using a detection result of the motion vector detection circuit 122, and the motion vector detection circuit 124 an instruction for using a detection result of the motion vector detection circuit 123.

In step S314, the control circuit 109 determines that, even if the motion vector is acquired from the image data of the first, second, and third ranks, the erroneous detection is scarcely generated, and, however, if the motion vector is acquired from the image data on the fourth rank, the erroneous detection is probably generated. Accordingly, the control circuit 109 determines to use the image data of the first, second, and third ranks but not that on the fourth rank to detect the motion vector.

More specifically, the control circuit 109 transmits an instruction for detecting the motion vector to the motion vector detection circuits 122, 123, and 124 but not to the motion vector detection circuit 121. Further, the control circuit 109 transmits to the motion vector detection circuit 123 an instruction for using the detection result of the motion vector detection circuit 122 to detect the motion vector, and to the motion vector detection circuit 124 an instruction for using the detection result of the motion vector detection circuit 123 to detect the motion vector.

In step S315, the control circuit 109 determines that, even if the motion vector is acquired from the image data of the first and second ranks, the erroneous detection is scarcely generated, and, however, if the motion vector is acquired from the image data on the third rank, the erroneous detection is probably generated. Accordingly, the control circuit 109 determines to use the image data of the first and second ranks but not that on the third rank to detect the motion vector.

More specifically, the control circuit 109 transmits instructions for detecting the motion vector to the motion vector detection circuits 123 and 124 but not to the motion vector detection circuits 121 and 122. Further, the control circuit 109 transmits to the motion vector detection circuit 124 an instruction for using the detection result of the motion vector detection circuit 123 to detect the motion vector.

In step S316, the control circuit 109 determines that, even if the motion vector is acquired from the image data on the first rank, the erroneous detection is scarcely generated, and, however, if the motion vector is acquired from the image data on the second rank, the erroneous detection is probably generated. Accordingly, the control circuit 109 determines to use the image data on the first rank but not that on the second rank to detect the motion vector. More specifically, the control circuit 109 transmits an instruction for detecting the motion vector to the motion vector detection circuit 124 but not to the motion vector detection circuits 121, 122, and 123.

The image processing apparatus according to the present exemplary embodiment determines of what ranks the image data can be used to detect the motion vector according to the rank determination processing described above. An example in which the image data of the first, second, third, and fourth ranks are used is described herein. However, the present invention is not limited thereto. The more the number of ranks is increased, in the wider ranges the motion vectors can be detected with the less number of arithmetic operations. Thus, when it is previously expected that the motion vectors are large, the number of ranks may be increased.

Further, the first, second, third, and fourth threshold values described above may be the same value. However, typically, the smaller the image data is reduced to, the less the evaluation value tends to be. Thus, the threshold values may become smaller from the first threshold value to the fourth threshold value. An appropriate value can be experimentally acquired for each of the first, second, third, and fourth threshold values.

The example has been described herein in which it is determined that an evaluation value of data of a certain rank is equal to or more than a threshold value and then, if the evaluation value is equal to or more than the threshold value, image data of the next rank is generated. However, the image data of the all ranks may be first generated and then the evaluation value of the image data of each rank may be acquired.

Next, the motion vector detection processing will be described. According to the present exemplary embodiment, the base block 203 in the image data 201 on the first rank is set to include 16×16 pixels, and the detection area 205 in the image data 202 on the first rank is set to include 32×32 pixels.

First, during the rank determination processing illustrated in FIG. 3, a case (step S310) where the control circuit 109 determines to use the image data of all ranks will be described. The motion vector detection circuit 121 reads the image data on the fourth rank of the base block 203 stored in the memory 107. Further, the motion vector detection circuit 121 reads, of the image data on the fourth rank stored in the memory 117, the image data of the region corresponding to the detection area 205.

Figure 5:
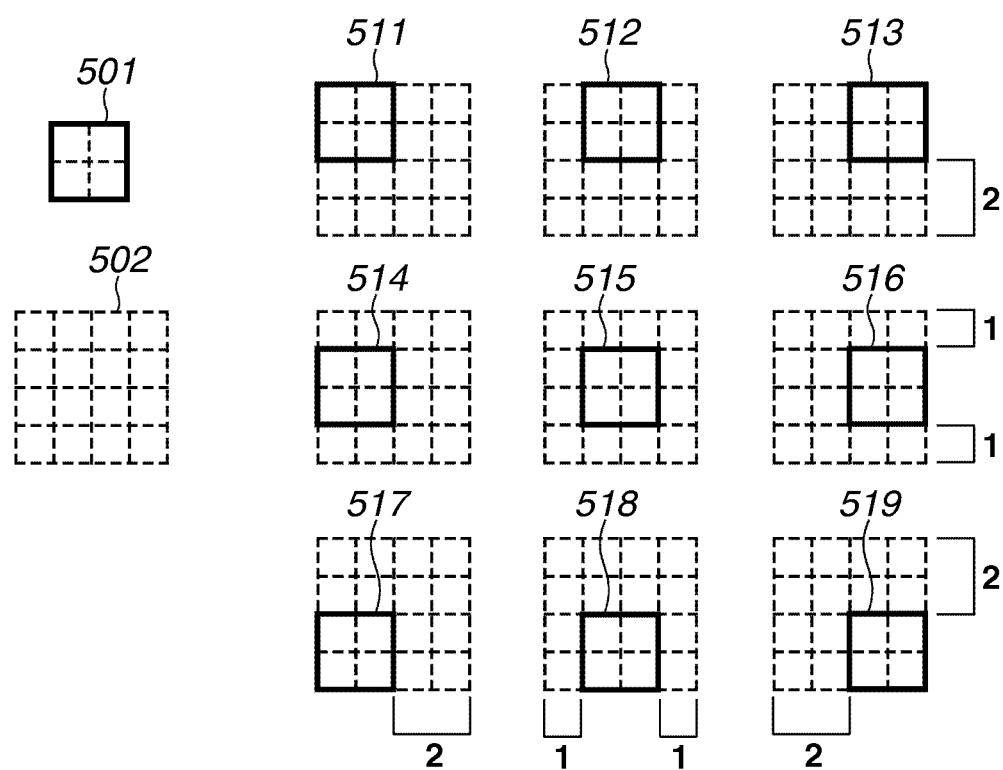
FIG. 5 illustrates how to set a target block in image data on a fourth rank.

FIG. 5 illustrates how to set the target block in the image data on the fourth rank. As illustrated in FIG. 5, image data 501 on the fourth rank of the base block 203 includes 2×2 pixels, and image data 502 corresponding to the detection area 205 on the fourth rank includes 4×4 pixels. Each of target blocks 511, 512, 513, 514, 515, 516, 517, 518, and 519 is set at a position that is sequentially shifted one pixel within the image data 502. According to the present exemplary embodiment, since the projection block 204 is positioned at a center of the detection area 205, a position of the image data of the target block 515 corresponds to that of the projection block 204.

The motion vector detection circuit 121 acquires the SAD, which is the sum of absolute differences between the signal level of the image in the image data 501 and the signal level of the image in each image data of the target blocks 511, 512, 513, 514, 515, 516, 517, 518, and 519. In this case, 9 SADs are acquired. The motion vector detection circuit 121 selects, from the image data of the target blocks 511, 512, 513, 514, 515, 516, 517, 518, and 519, the image data having the highest correlation with the image data 501, in other words, the smallest SAD.

A shift between positions of the selected image data and the projection block 204 (position of the target block 515 illustrated in FIG. 5) becomes the motion vector. For example, in the case of the smallest SAD of the image data of the target block 511, as a result of detecting the motion vector, the motion vector detection circuit 121 outputs (−1, −1), which means that the target block is moved left one pixel and up one pixel from the target block 515.

The motion vector detection circuit 122 receives the result of detecting the motion vector from the motion vector detection circuit 121. The motion vector detection circuit 122 reads the image data of the base block 203 on the third rank stored in the memory 105. Further, the motion vector detection circuit 122 reads, of the image data on the third rank stored in the memory 115, the image data of the region corresponding to the detection result by the motion vector detection circuit 121.

Figure 6:
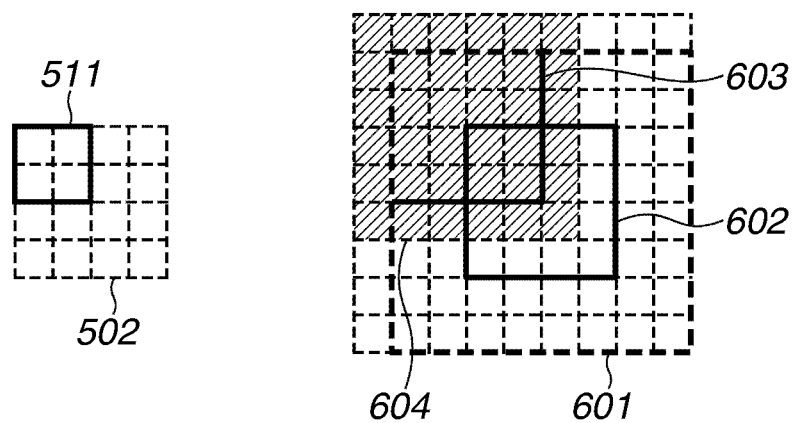
FIG. 6 illustrates how to set a new detection area in image data on a third rank.

FIG. 6 illustrates how to set a new detection area in the image data on the third rank. The motion vector detection circuit 122 sets a new detection area in the image data on the third rank corresponding to the detection result (−1, −1) indicating the position of the target block 517 illustrated in FIG. 5. Image data 601 is the image data on the third rank stored in the memory 115, and a position of a block 602 located at a center of the image data 601 corresponds to that of the projection block 204.

Since the number of pixels of the image data 202 on the third rank is double that of the image data 202 on the fourth rank each vertically and horizontally, a position of a block 603 that is (−2, −2) moved from the block 602 corresponds to that of the target block 511 illustrated in FIG. 5. The motion vector detection circuit 122 sets a region acquired by expanding the block 603 about the position of the block 603 by one pixel each vertically and horizontally as a new detection area 604. Based on the result of detecting the motion vector on the fourth rank, an outer region of the detection area 604 can be excluded from an object where the motion vector is acquired.

Figure 7:
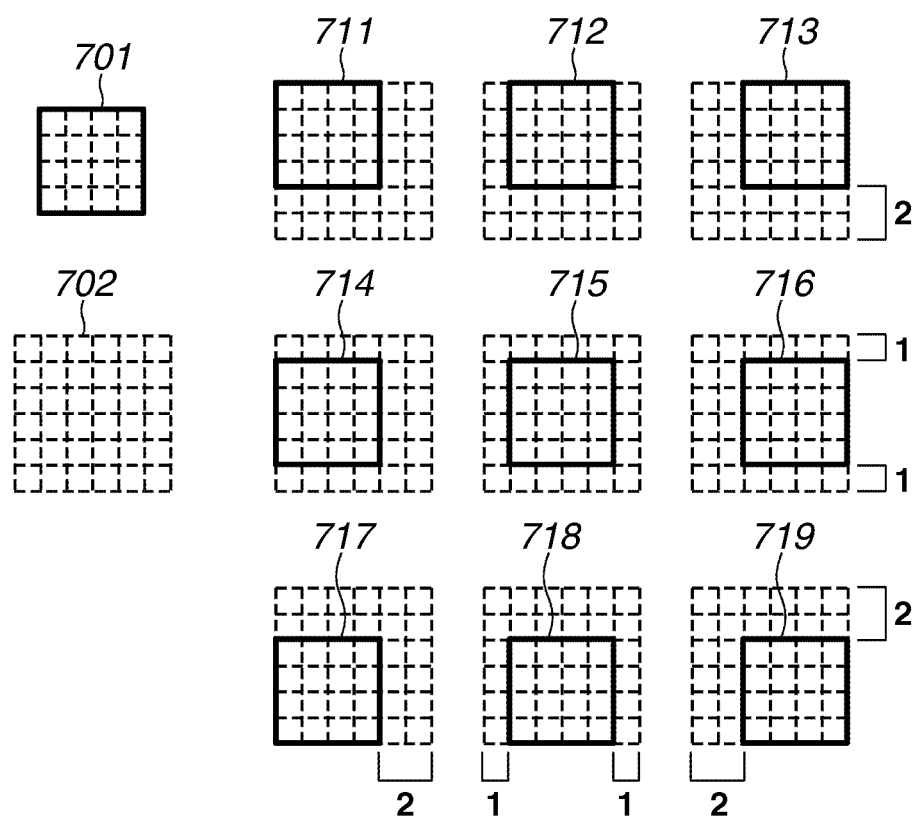
FIG. 7 illustrates how to set a target block in image data on a third rank.

FIG. 7 illustrates how to set the target block in the image data on the third rank. Image data 701 of the base block 203 on the third rank includes 4×4 pixels, and image data 702 of the newly-set detection area on the third rank includes 6×6 pixels. The image data 702 illustrated in FIG. 7 is the same as the image data of the detection area 604 illustrated in FIG. 6.

Each of target blocks 711, 712, 713, 714, 715, 716, 717, 718, and 719 is set at a position that is sequentially shifted one pixel within the image data 702. The position of the target block 715 corresponds to that of the block 603 illustrated in FIG. 6. The motion vector detection circuit 122 acquires the SAD, which is the sum of absolute differences between the signal level of the image in the image data 701 and the signal level of the image in each image data of the target blocks 711, 712, 713, 714, 715, 716, 717, 718, and 719.

In this case, 9 SADs are acquired. The motion vector detection circuit 122 selects the target block having the highest correlation with the image data 701, in other words, the smallest SAD. The shift between the positions of the selected target block and the projection block 204 (position of the block 602 illustrated in FIG. 6) becomes the motion vector. For example, when the SAD of the image data of the target block 716 is the smallest, as a result of detecting the motion vector, the motion vector detection circuit 121 outputs (−1, −2), which means that the target block is moved left one pixel and up two pixels from the position of the block 602.

The motion vector detection circuit 123 receives the result of detecting the motion vector from the motion vector detection circuit 122. The motion vector detection circuit 123 reads the image data on the second rank of the base block 203 stored in the memory 103. Further, the motion vector detection circuit 123 reads, of the image data on the second rank stored in the memory 113, the image data of the region corresponding to the detection result by the motion vector detection circuit 122. Furthermore, the motion vector detection circuit 123 performs processing similar to that performed by the motion vector detection circuit 122 on the image data on the third rank using the image data on the second rank to detect the motion vector in the image data on the second rank.

Similarly, the motion vector detection circuit 124 receives the result of detecting the motion vector from the motion vector detection circuit 123. The motion vector detection circuit 124 reads the image data of the base block 203 on the first rank stored in the memory 101. Further, the motion vector detection circuit 124 reads, of the image data on the first rank stored in the memory 111, the image data of the region corresponding to the detection result by the motion vector detection circuit 123.

The motion vector detection circuit 124 performs processing similar to that performed by the motion vector detection circuit 122 on the image data on the second rank to detect the motion vector in the image data on the first rank using the image data on the first rank. The detection result output from the motion vector detection circuit 124 is the final motion vector of the base block 203.

Accordingly, the motion vector detection circuits 121, 122, 123, and 124 perform the arithmetic operation for the SAD nine times each, thereby performing only 36 times in total. As described above, the image processing apparatus of the present exemplary embodiment acquires the area for detecting the correlation in the (n−1)th rank about the position acquired by doubling the motion vector acquired in the image data on the n-th rank, and then detects the motion vector in the (n−1)th rank within the detection area. The "n" herein is a natural number equal to or more than "2".

When the rank for generating the image data is to be increased, the number of times of repeating this processing may be increased. Further, to generate the image data on the n-th rank by reducing that on the (n−1) th rank to 1/m each vertically and horizontally, the motion vector acquired from the image data in the n-th rank is multiplied by "m" to acquire the center position of the projection block of the image data of the (n−1) th rank.

Next, during the rank determination processing illustrated in FIG. 3, a case will be described where the control circuit 109 determines to use the image data of the first, second, and third ranks in step S314. The motion vector detection circuit 122 reads the image data of the base block 203 on the third rank stored in the memory 105. The motion vector detection circuit 122 reads, of the image data on the third rank stored in the memory 115, the image data of the region corresponding to the detection area 205. In this case, since the motion vector is not detected using the image data on the fourth rank, the motion vector detection circuit 122 does not receive the result of detecting the motion vector from the motion vector detection circuit 121.

The image data of the detection area 205 on the third rank includes 8×8 pixels and thus, the motion vector detection circuit 122 detects the motion vector in the detection area including 8×8 pixels. Since the image data of the base block 203 on the third rank includes 4×4 pixels, 25 SADs are acquired herein. The motion vector detection circuit 122 acquires the position of the target block having the smallest SAD and then outputs the shift between the positions of the target block and the projection block 204 as the motion vector.

The motion vector detection circuit 123 receives the result of detecting the motion vector from the motion vector detection circuit 122. The motion vector detection circuit 123 reads the image data of the base block 203 on the second rank stored in the memory 103. Further, of the image data on the second rank stored in the memory 113, the motion vector detection circuit 123 reads the image data of the region corresponding to the detection result by the motion vector detection circuit 122. By a method similar to that described above, the motion vector detection circuit 123 detects the motion vector on the second rank as below.

The motion vector detection circuit 124 receives the result of detecting the motion vector from the motion vector detection circuit 123. The motion vector detection circuit 124 reads the image data of the base block 203 on the first rank stored in the memory 101. Further, the motion vector detection circuit 124 reads, of the image data on the first rank stored in the memory 111, the image data of the region corresponding to the detection result by the motion vector detection circuit 123. By a method similar to that described above, the motion vector detection circuit 124 detects the motion vector on the first rank as below.

During the rank determination processing illustrated in FIG. 3, a case will be described where the control circuit 109 determines to use the image data on the first and second ranks in step S315. The motion vector detection circuit 123 reads the image data of the base block 203 on the second rank stored in the memory 103. Further, of the image data on the second rank stored in the memory 113, the motion vector detection circuit 123 reads the image data of the region corresponding to the detection area 205. In this case, since the motion vector is not detected using the image data on the third rank, the motion vector detection circuit 123 does not receive the result of detecting the motion vector from the motion vector detection circuit 122.

The image data of the detection area 205 on the second rank includes 16×16 pixels and thus, the motion vector detection circuit 123 detects the motion vector in the detection area including 16×16 pixels. Since the image data of the base block 203 on the second rank includes 8×8 pixels, 81 SADs are acquired herein.

The motion vector detection circuit 123 acquires the position of the target block having the smallest SAD and then outputs the shift between the positions of the target block and the projection block 204 as the motion vector.

The motion vector detection circuit 124 receives the result of detecting the motion vector from the motion vector detection circuit 123. The motion vector detection circuit 124 reads the image data of the base block 203 on the first rank stored in the memory 101.

Further, the motion vector detection circuit 124 reads, of the image data on the first rank stored in the memory 111, the image data in the region according to the detection result by the motion vector detection circuit 123. The processing described above is subsequently performed.

During the rank determination processing illustrated in FIG. 3, when the control circuit 109 determines to use only the image data on the first rank in step S316, the control circuit 109 does not make the reduction circuits 112, 113, 114, 115, and 116 perform the processing but transmits an instruction for detecting the motion vector only to the motion vector detection circuit 124. Subsequently, the motion vector detection circuit 124 reads the image data of the base block 203 on the first rank stored in the memory 101.

Further, the motion vector detection circuit 124 reads, of the image data on the first rank stored in the memory 111, the image data of the region corresponding to the detection area 205. In this case, since the motion vector is not detected using the image data on the second rank, the motion vector detection circuit 124 does not receive the result of detecting the motion vector from the motion vector detection circuit 123.

The image data of the detection area 205 on the first rank includes 32×32 pixels and thus, the motion vector detection circuit 123 detects the motion vector in the detection area including 32×32 pixels. Since the image data of the base block 203 on the first rank includes 16×16 pixels, 289 SADs are acquired herein. The motion vector detection circuit 124 acquires the position of the target block having the smallest SAD and outputs the shift between the positions of the target block and the projection block 204 as the final motion vector of the base block 203.

When the motion vector of any base block 203 in the image data 201 is detected, the control circuit 109 subsequently detects the motion vector of another base block 203. Alternatively, as with a main object region, using only a part of the image data 201 as the base block 203, only the motion vector of a part of the region may be detected.

As described above, according to the image processing apparatus of the present exemplary embodiment, when the correlation between the image data is calculated, the image data on a plurality of ranks that is step-by-step reduced to decrease the amount of arithmetic operation is used. However, since possibility for erroneously determining the correlation is increased due to the reduction of the image data, the evaluation value for evaluating the possibility is calculated, and then the rank of the image data to be used for detecting the motion vector is determined corresponding to the evaluation value. Therefore, according to the image processing apparatus of the present exemplary embodiment, while suppressing the erroneous detection, the load of the arithmetic operation for detecting the motion vector can be decreased.

According to the exemplary embodiment described above, the amount of the arithmetic operation when the motion vector is detected from the image data on the n-th rank is greatly different from that when the motion vector can be detected only from the image data on the (n-1)th rank.

According to a second exemplary embodiment of the present invention, a configuration will be described in which, even when the motion vector cannot be detected from the image data on the n-th rank, the number of arithmetic operations for detecting the motion vector in the image data on the (n-1)th rank can be decreased.

A case will be described as an example where, during the rank determination processing illustrated in FIG. 3, the control circuit 109 determines to use the image data on the first, second, and third ranks in step S314. The motion vector detection circuit 122 reads the image data of the base block 203 on the third rank stored in the memory 105.

The motion vector detection circuit 122 reads, of the image data on the third rank stored in the memory 115, the image data of the region corresponding to the detection area 205. The image data of the base block 203 on the third rank includes 4×4 pixels, and that of the detection area 205 on the third rank includes 8×8 pixels. According to the first exemplary embodiment, since the motion vector detection circuit 122 sets the target block while moving its position by each one pixel within the detection area 205, 25 target blocks are set.

Figure 8:
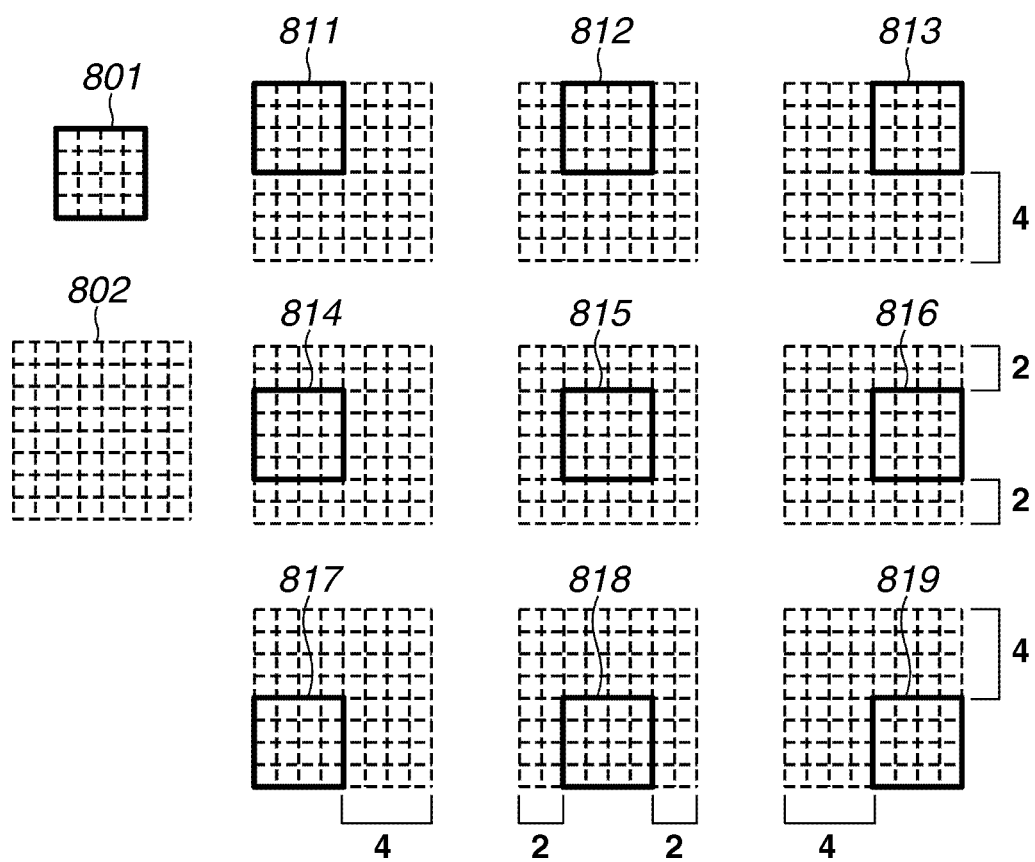
FIG. 8 illustrates how to set a target block in image data on the third rank.
Figure 9:
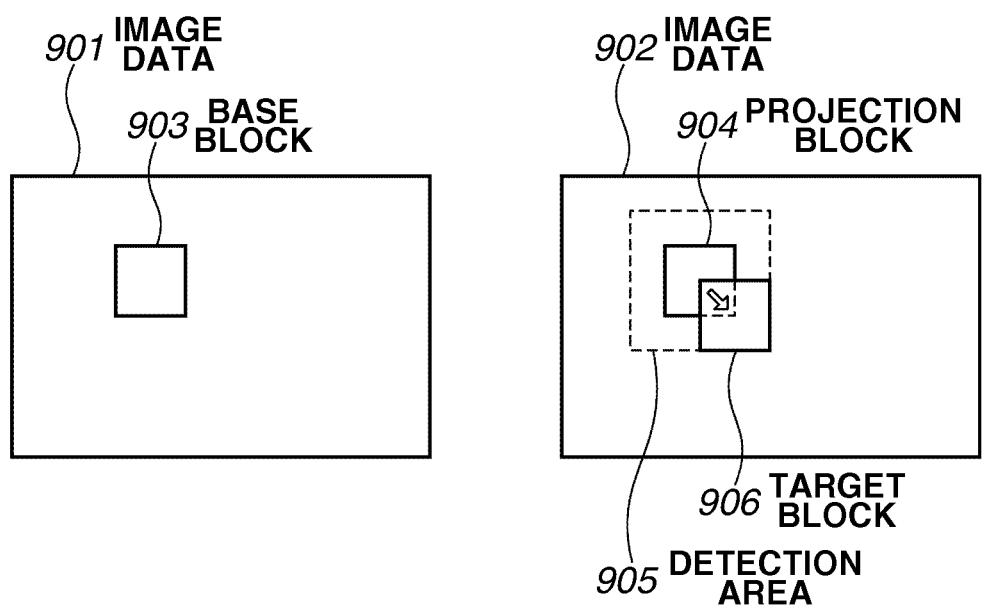
FIG. 9 schematically illustrates block matching.
Figure 10:
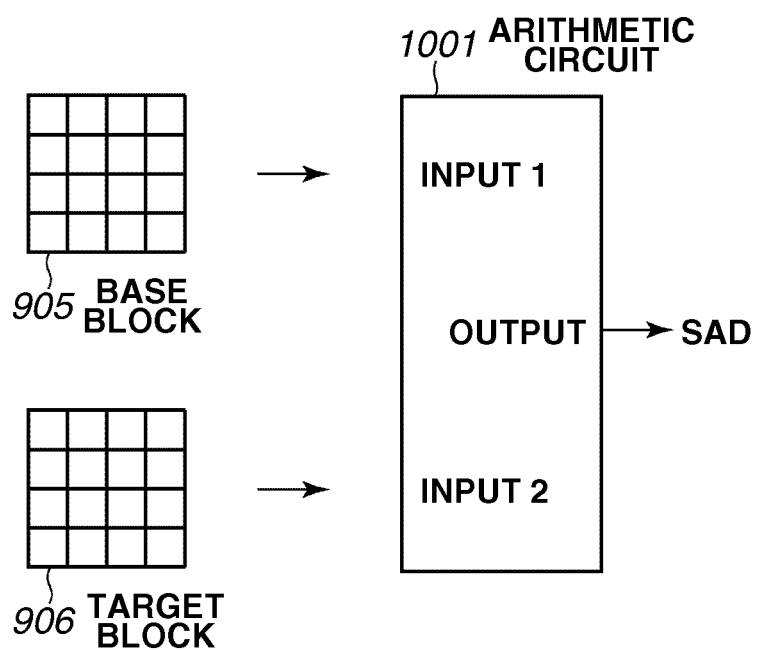
FIG. 10 illustrates an arithmetic circuit for acquiring SAD from an image of abase block and that of a target block.

On the other hand, according to the present exemplary embodiment, the motion vector detection circuit 122 sets the target block while moving its position by two pixels within the detection area 205. FIG. 8 illustrates how to set the target block in the image data on the third rank. As illustrated in FIG. 8, image data 801 of the base block 203 on the third rank includes 4×4 pixels, and image data 802 corresponding to the detection area 205 on the third rank includes 8×8 pixels. Each of target blocks 811, 812, 813, 814, 815, 816, 817, 818, and 819 is set at a position as being moved by every two pixels in sequence within the image data 802. The position of the target block 815 corresponds to that of the projection block 204.

The motion vector detection circuit 122 selects the target block having the smallest SAD from among nine target blocks 811, 812, 813, 814, 815, 816, 817, 818, and 819. The motion vector detection circuit 122 newly sets a search area including 6×6 pixels while moving the search area by one pixel each up, down, right, and left about the selected target block similarly to FIG. 7 to set the nine target blocks. Further, the motion vector detection circuit 122 outputs a shift of the target block having the smallest SAD relative to the target block 815 as the result of detecting the motion vector on the third rank.

As described above, by acquiring the SAD step-by-step while changing the amount of moving the target block, the motion vector can be detected with 18 SADs. The image data on the third rank is described as an example herein and, further, the similar processing can be also applied using the second rank or the first rank. An example is described herein in which the target block is set in two steps to acquire the motion vector. However, the present invention is not limited thereto. The amount of moving the target block may be set in three steps, for example, four pixels, two pixels, and one pixel, or in four steps, for example, eight pixels, four pixels, two pixels, and one pixel. According to the amount of the necessary arithmetic operation for the SAD, the number of steps may be appropriately set.

As described above, according to the image processing apparatus of the present exemplary embodiment, even when the image data on the rank including less pixels is not generated, the load of the arithmetic operation for detecting the motion vector can be decreased while suppressing the erroneous detection of the motion vector.

According to each exemplary embodiment, using the image data of the base block 203, the evaluation circuit 108 can acquire the evaluation value for each base block 203. However, the present invention is not limited thereto. A reduction circuit separate from the reduction circuits 102, 103, 104, 105, and 106 for reducing the base block 203 may be provided to generate the image data on each rank for the whole image data 201.

In this case, the evaluation value for the whole image data 201 is acquired from the image data on each rank, and then from the evaluation value for the whole image data 201, on which rank the image data is used to detect the motion vector in the whole base block 203 may be determined. Alternatively, for example, the image data 201 is separated into that on a plurality of ranks having different frequency bands by a wavelet conversion, and then the evaluation value may be acquired from the image data on theses ranks.

Further, the evaluation circuit 108 may acquire the evaluation value using, instead of the image data 201, the image data 202 for acquiring the correlation between the image data 201 and the image data 202. That is because, if the image data 201 and the image data 202 are included in a moving image as sequential frames, whichever may be used to acquire the evaluation value, a great difference will not be probably generated.

Alternatively, the evaluation value is acquired from both of the image data 201 and the image data 202, and when both evaluation values are equal to or more than the threshold value, the motion vector may be detected using the image data on that rank.

Further, regardless of the evaluation value by the evaluation circuit 108, the motion vector may not be detected from the image data on the rank on which the number of pixels is equal to or less than a predetermined value. More specifically, according to the number of pixels included in the image data on the first rank that is set by the user, it may be automatically determined on which rank image data can be generated.

Further, the image processing apparatus described above maybe mounted inside of a camera that can shoot a moving image. By performing the processing on the generated moving image inside of the camera in real time, image stabilizing processing can be effectively performed. Alternatively, a provider server may include the above-described image processing apparatus to detect the motion vector from a moving image or continuously shot images transmitted from the user terminal via the internet.

Further, the present invention can be realized when the following processing is performed. More specifically, processing is performed in which a program of computer executable instructions including program code for realizing functions of one or more of the above-described exemplary embodiments is supplied to a system or an apparatus via a network or various kinds of non-transitory computer-readable storage media, and then a computer (or a central processing unit (CPU) or a micro processing unit (MPU)) in the system or the apparatus reads and executes the program. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-156921 filed Jul. 9, 2010, which is hereby incorporated by reference herein in its entirety.

What is claimed is:

1. An image processing apparatus comprising:
a reduction unit configured to generate image data on a plurality of ranks by reducing image data to generate image data on another rank, and generate base block data on a plurality of ranks by reducing base block data to generate base block data on another rank;
an evaluation unit configured to calculate an evaluation value of sharpness of the image data; and
a motion vector detection unit configured to set a plurality of pieces of target block data on a plurality of positions, that have the same size as base block data on the same rank, on the image data, acquire correlation between the target block data and the base block data having the same size for each of the plurality of positions, and detect a motion vector based on the acquired correlations,
wherein, when the evaluation value of image data on a second rank generated by reducing image data on a first rank is equal to or more than a predetermined threshold value, the motion vector detection unit detects a first motion vector in the image data on the second rank, sets a first detection area in the image data on the first rank based on the detected first motion vector, and sets the plurality of pieces of target block data on a plurality of positions shifted by a first amount in the first detection area to detect a second motion vector in the image data on the first rank, and
wherein, when the evaluation value of the image data on the second rank is not equal to or more than the predetermined threshold value, the motion vector detection unit sets the plurality of pieces of target block data on a plurality of positions shifted by a second amount that is larger than the first amount in the image data on the first rank, detects a third motion vector in the image data on the first rank based on correlations between each target block data and the base block data, sets a second detection area in the image data on the first rank based on the detected third motion vector, and sets the plurality of pieces of target block data on a plurality of positions shifted by a third amount that is less than the second amount in the second detection area to detect a fourth motion vector in the image data on the first rank.

2. The imaging processing apparatus according to claim 1, wherein the reduction unit repeats processing for reducing the image data to generate the image data on another rank, and
wherein the motion vector detection unit repeats detection of the motion vector and setting of a detection area sequentially from, of the image data on a plurality of ranks having the evaluation value that is equal to or more than a predetermined threshold value, the image data on a rank on which the image data is reduced most.

3. The image processing apparatus according to claim 1, wherein the evaluation unit calculates the evaluation value using a value of a high-frequency component extracted from the image data.

4. The image processing apparatus according to claim 3, wherein the evaluation unit includes a filter unit configured to extract the high-frequency component from the image data, and an integration unit configured to integrate an absolute value of an output of the filter unit.

5. An image processing method comprising:
generating image data on a plurality of ranks by reducing image data to generate image data on another rank;
calculating an evaluation value of sharpness of the image data;
setting a plurality of pieces of target block data on a plurality of positions, that have the same size as the base block data on a same rank, on the image data;
acquiring correlations between each target block and the base block;
detecting a motion vector based on the acquired correlations;
when the evaluation value of image data on a second rank generated by reducing image data on a first rank is equal to or more than a predetermined threshold value, detects a first motion vector in the image data on the second rank, setting a first detection area in the image data on the first rank based on the detected first motion vector, and setting a plurality of pieces of target block data on a plurality of positions shifted by a first amount in the first detection area to detect a second motion vector in the image data on the first rank; and
when the evaluation value of the image data on the second rank is not equal to or more than the predetermined threshold value, setting a plurality of pieces of target block data on a plurality of positions shifted by a second amount that is larger than the first amount in the image data on the first rank, detecting a third motion vector in the image data on the first rank based on correlations between each target block and the base block, setting a second detection area in the image data on the first rank based on the detected third motion vector, and setting a plurality of pieces of target block data on a plurality of positions shifted by a third amount that is less than the second amount in the second detection area to detect a fourth motion vector in the image data on the first rank.

6. A non-transitory machine-readable storage medium storing a program of instruction that, when executed by a computer, causes the computer to perform the image processing method according to claim 5.

* * * * *